June 21, 1960 M. A. CLEMENT 2,942,067
READOUT AMPLIFIER CIRCUIT FOR TOLL TICKETING
Filed Sept. 21, 1956
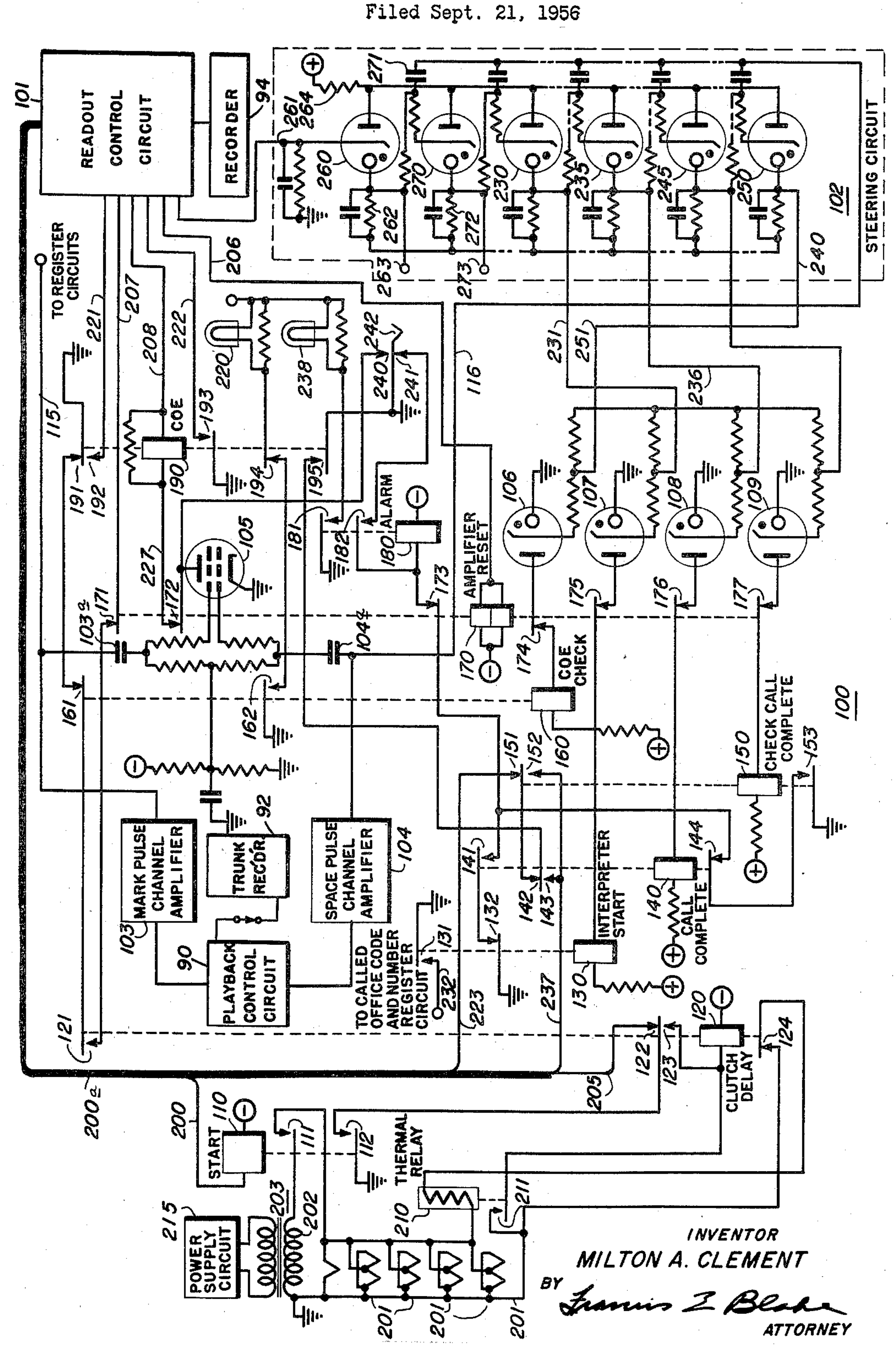
INVENTOR
MILTON A. CLEMENT
BY [signature]
ATTORNEY United States Patent Office 2,942,067

Patented June 21, 1960

2,942,067

READOUT AMPLIFIER CIRCUIT FOR TOLL TICKETING

Milton A. Clement, Rochester, N.Y., assignor to General Dynamics Corporation, Rochester, N.Y., a corporation of Delaware Filed Sept. 21, 1956, Ser. No. 611,135

9 Claims. (Cl. 179—7)

The present invention relates to a telephone system and, more particularly, to a system for automatically ticketing toll calls.

In automatic toll ticketing systems of the type shown in the copending application of Frank A. Morris et al., Serial No. 348,202, filed April 13, 1953, and Milton A. Clement et al., Serial No. 536,579, filed September 26, 1955, which applications are assigned to the same assignee as the present application, items of information pertaining to a plurality of toll calls are automatically collected and stored on a length of magnetic tape in a trunk recorder together with both space signals which are interposed between adjacent groups of recorded intelligence or data signals and end-of-call or COE signals which are recorded on the tape following the data pertaining to each call. When the stored or recorded data is to be permanently recorded, as by printing or perforating, a readout control circuit seizes the recorder and initiates movement of the tape relative to transducing means so that the stored data is simultaneously transmitted and erased.

The transmitted data is stored in different registers under the control of a gating or steering circuit which is advanced step by step by the recorded space pulses, and this steering circuit, after predetermined information has been transmitted and registered, initiates the operation of various circuit components, such as an office code translator. The transmission and receipt of a preliminary COE signal, which is the first item of information on the tape, resets the registers, and subsequently transmitted COE signals are used to start the recording of the registered data pertaining to each call and then to reset the registers since this signal is the last item stored on the tape in conjunction with each call. These subsequent COE signals also arrest movement of the tape during the recording operation. The readout control means include means operated by the end-of-call signal, if received before all of the necessary call data is stored, as in the case of incomplete calls, for resetting the registers without a recording operation.

Accordingly, one object of the present invention is to provide new and improved automatic toll ticketing means.

Another object is to provide an automatic toll ticketing system including new and improved means for delaying the transmission of stored toll call data to a recorder until data registers and transmission paths therefor are conditioned for operation.

A further object of the present invention is to provide improved means for initiating a recording operation following the transmission of all of the data pertaining to a complete toll call from register means to data storage means associated with a recorder.

A still further object of the present invention is to provide improved means for initiating a resetting or recording operation in accordance with whether data pertaining to a complete or an incomplete call has been transmitted to a recording means.

Another object is to provide separate control means for initiating a toll data recording or resetting operation and including means for providing an indication of the inoperability of one of said control means.

Other objects and advantages of the present invention will become apparent from the ensuing description of an illustrative embodiment thereof in the course of which reference is had to the accompanying drawing comprising a circuit diagram illustrating a control circuit embodying the present invention which is shown in conjunction with portions of a toll ticketing system.

In general, the present invention is directed to the provision of a readout amplifier control circuit 100 which is used in automatic toll ticketing systems of the type disclosed in the above-identified copending Morris et al. and the Clement et al. applications. In these systems, the items of information pertaining to a plurality of toll calls are stored in each of a plurality of separate trunk recorders 92 individually associated with line extending means, such as adapter or trunk circuits. These trunk or adapter circuits are seized during the extension of a toll call so that the trunk recorder 92 associated therewith is conditioned to receive and store the items of information pertaining to the call. The trunk recorder 92 comprises an endless loop of magnetic tape adjacent to contiguous, transversely spaced portions of which are disposed a space pulse transducing head and a mark pulse transducing head. During the data collecting and storing operation, the mark pulse transducing head is supplied with a plurality of groups of pulses in accordance with the values of the digital information which are to be stored in the trunk recorder 92, and the space pulse transducing head is supplied with a pulse at the end of each group of mark pulses, thereby to provide a means for separating the successively stored items of information. At the end of a call, a COE or end-of-call signal comprising simultaneous mark and space pulses is recorded on the magnetic tape to provide an indication that all of the items of information pertaining to a particular call have been stored and to indicate that the next items which are to be transmitted pertain to a succeeding call.

When it is desired to play back or transmit the items of information stored in each of the group of trunk recorders 92 to a common recording apparatus 94, such as a perforator or a printer, a readout control circuit 101 similar to the like identified circuit in the above-identified copending Clement et al. application is placed in operation so that a playback control circuit 90 operates a switching means associated therewith. This switching means sequentially seizes each of the adapter or trunk circuits so that the trunk recorder 92 associated therewith is conditioned to transmit the items of information through the playback control circuit 90 to electronic data registers which are associated with the recording apparatus. These electronic data registers are capable of storing the items of information pertaining to only a single call so that the trunk recorder 92 is controlled by the readout control circuit 101 to permit only the items of information pertaining to a single call to be transmitted to the data registers until such time as the transmitted data has been recorded in a permanent form by the recording apparatus 94 and the registers cleared to permit them to store the items of information pertaining to the next call. In the event that the data transmitted from the trunk recorder 92 pertains to an incomplete call, as contrasted with a complete call, the readout amplifier circuit 100 and the readout control circuit 101 operates to reset the electronic data registers to a normal position without initiating a recording operation, so as to prevent the production of tickets pertaining to incomplete calls.

Following the completion of the transmission of all of the items of information stored in a single trunk recorder 92, the playback control circuit 90 releases the seized adapter or trunk circuit and steps to seize the next idle trunk circuit or adapter, together with its associated trunk recorder 92. This operation continues until such time as all of the items of information stored in the trunk recorders 92 to which the playback control circuit 90 has access have been played back. The readout control circuit 101 then seizes the next playback control circuit to play back the items of information stored in the trunk recorders to which this next playback control circuit has access. Following the completion of the transmission of all of the stored items of information, the readout facilities, including the readout amplifier circuit 100 and the readout control circuit 101, are restored to their normal condition.

Referring now in more detail to the single sheet of drawings, in being placed in operation to initiate a playback or readout cycle of operation, the readout control circuit 101 applies ground to a conductor 200 which extends over a cable 200*a* from the readout control circuit 101 to the readout amplifier circuit 100, thereby completing an obvious operating circuit for a start relay 110 so that this relay operates to close a plurality of contacts 111 and 112. The closure of the contacts 111 completes a circuit for connecting a plurality of filaments for the tubes in a pair of mark pulse and space pulse amplifiers 103 and 104, for instance, to a secondary winding 202 of a transformer 203 energized by a power supply circuit 215. The completion of the energizing circuit for the filaments 201 initiates the heating of the tubes in the amplifiers 103 and 104, as well as any other hot cathode control tubes in the recording facilities, to condition these tubes for receiving space and mark pulse information from the trunk recorder 92 which is to be connected to the inputs of the mark pulse amplifier 103 and the space pulse amplifier 104 by the seized playback control circuit 90.

The closure of the contacts 112 applies ground through a pair of normally closed contacts 122 to a conductor 205 extending to the readout control circuit 101 to complete an operating circuit for a reset relay therein. The operation of the reset relay resets the registers to which the call data is to be transmitted and applies ground to a conductor 206 to complete an operating circuit for an amplifier reset relay 170. The operation of the amplifier reset relay 170 opens a plurality of contacts 171, 172, 173, 174, 175, 176 and 177. The opening of the contacts 171 opens another point in a circuit for applying ground to a clutch conductor 207. The opening of the contacts 172, 174, 175, 176 and 177 opens the plate circuits of a plurality of control tubes 105, 106, 107, 108 and 109 to insure that these tubes are in nonconductive condition.

In order to initiate movement of the magnetic tape in the trunk recorder 92 and the transmission of mark and space data after the tube filaments 201 have been sufficiently heated to provide proper operation of the amplifiers 103 and 104, there is provided a thermal-responsive relay 210. The relay 210 is connected in shunt with the secondary winding 202 of the transformer 203 through a pair of normally closed contacts 124. When the relay 110 is operated to close the contacts 111, the relay 210 is energized so that, after a delay interval sufficient to heat the filaments 201, a pair of contacts 211 are closed to complete an operating circuit for a clutch delay relay 120 extending to the grounded side of the secondary winding 202.

The operation of the clutch delay relay 120 closes a plurality of contacts 121 and 123 and opens a plurality of contacts 122 and 124. The closure of the contacts 123 provides a holding circuit for the clutch delay relay 120 extending to the closed and grounded contacts 112. The opening of the contacts 124 disconnects the thermal-responsive relay 210 from the winding 202 so that this relay releases to open the contacts 211. However, the relay 120 remains operated due to the holding ground provided at the closed contacts 112. The closure of contacts 121 prepares a path for applying ground to the clutch conductor 207 which is interrupted at the open contacts 171.

The opening of the contacts 122 interrupts the above-described operating circuit for the reset relay in the readout control circuit 101 so that this relay releases. The release of the reset relay removes ground from the conductor 206 to release the amplifier reset relay 170. The release of the amplifier reset relay 170 closes the contacts 171—177. The closure of the contacts 172, 174, 175, 176 and 177 applies a B+ voltages to the plates of the tubes 105, 106, 107, 108 and 109 to condition these tubes for operation. The closure of the contacts 173 prepares an operating circuit for the alarm relay 180.

The closure of the contacts 171 completes a circuit for extending ground through a plurality of closed contacts 191, 161, 121, and 171 to the clutch conductor 207. The application of ground to the conductor 207 at this time indicates both that the readout control circuit 101 is conditioned for operation and that the readout amplifier circuit 100 has been cleared and is conditioned for operation in controlling the storage of data pertaining to a toll call in the electronic registers associated with the recording facilities. The application of ground to the conductor 207 operates the seized playback control circuit to search for and seize an idle trunk circuit or adapter and, incident to the seizure of this trunk or adapter circuit, the transducing heads, including the mark and space pulse transducing heads, and an erasing head are cut through to the seized playback control circuit 90. The mark and space pulse heads in the trunk recorder 92 are connected to a pre-amplifier in the playback control circuit 90, the output of which is connected to the input of the mark pulse amplifier 103 and the space pulse amplifier 104 in the readout amplifier circuit 100. When the seizure of an adapter or trunk circuit and its associated trunk recorder 92 has been completed, the ground provided on the conductor 207 is forwarded to the seized trunk recorder to initiate movement of the magnetic tape therein, thereby to start the transmission of information from the seized trunk recorder 92 to the amplifiers 103 and 104.

The first item of information stored on the magnetic tape is a preliminary end-of-call or COE signal comprising simultaneous mark and space pulses or concurrent signal bits. Therefore, when movement of the magnetic tape is initiated, simultaneous mark and space pulses are transmitted through the amplifiers 103 and 104 to a common mark pulse conductor 115 and a space pulse conductor 116. The conductor 115 is connected in common to the input control of drive tubes of each of the electronic storage devices associated with the recording facilities, thereby to permit the digital values represented by the groups of mark pulses to be stored therein. The space pulse conductor 116 is connected to the input of a steering circuit 102, which sequentially renders each of the electronic storage devices effective to receive only one group of mark pulses. However, since the first item of information transmitted following the seizure of a trunk recorder is a COE signal, the simultaneous mark and space pulses supplied to the conductors 115 and 116 serve no useful function at this time insofar as the storage of information in the data registers is concerned. However, the preliminary COE signal is utilized to check the adequacy of the transmission channel between the seized trunk recorder and the readout amplifier circuit 100.

More specifically, if the paths through the playback control circuit 90 and the trunk circuit are complete and the amplifying channels are fully operative, the simultaneous mark and space pulses are applied to the control electrodes of a COE tube 105 through a pair of condensers 103*a* and 104*a* to fire this tube. The firing of the tube 105 provides a conductive path from B+ in the circuit 101 to ground through a conductor 208, a pair of closed contacts 172, and the winding of a COE relay 190, whereby the COE relay 190 is operated. The operation of the COE relay 190 opens a plurality of contacts 191 and 194 and closes a plurality of contacts 192, 193 and 195.

The opening of the contacts 194 interrupts an additional point in an open energizing circuit for an alarm lamp 220. The opening of the contacts 191 removes ground from the conductor 207 to terminate movement of the magnetic tape in the seized trunk recorder 92 and to also cause energization of the erase head in the seized trunk recorder since the transmission channels have been found to be in an operative condition. The closure of the contacts 192 applies ground to a conductor 221 to prepare a circuit used to indicate the completion of data transmissions through one of the playback control circuits. The closure of the contacts 193 applies ground over a conductor 222 to a holding circuit for a relay in the above circuit to maintain circuit continuity in the interval in which the COE relay 190 is operated. The closure of the contacts 195 completes an operating circuit for the reset relay in the readout control circuit 101 including the contacts 195, a plurality of normally closed contacts 142 and 151, and a conductor 223.

The operation of this reset relay applies ground to the conductor 206 to operate the amplifier reset relay 170 with the attendant opening of the contacts 171–177, whereby the control tubes 106, 107, 108 and 109 are again cleared in the manner described above. The opening of the contacts 171 interrupts an additional point in the circuit for applying ground to the clutch conductor 207. The opening of the contacts 172, however, interrupts the above-described operating circuit for the COE tube 105 and the COE relay 190 so that the COE tube 105 is extinguished and the COE relay 190 is released. The release of the COE relay 190 closes the contacts 191 and 194 and opens the contacts 192, 193 and 195.

The opening of the contacts 192 removes ground from the conductor 221, but the erase relay in the readout control circuit 101 remains operated over a holding circuit therefor. The closure of the contacts 194 prepares a circuit for operating the alarm 220, and the closure of the contacts 191 prepares a path for applying ground to the clutch conductor 207. The opening of the contacts 195 interrupts the above-described operating circuit for the reset relay in the readout control circuit 101 so that this relay releases to remove ground from the conductor 206 and thus releases the amplifier reset relay 170. The release of amplifier reset relay 170 closes the contacts 171–177, and the closure of the contacts 172, 173, 174, 175, 176 and 177 serves the same functions described above. However, the closure of the contacts 171 again applies ground to the clutch conductor 207 to initiate the transmission of the stored data relating to the first toll call from the seized trunk recorder 92 to the readout amplifier control circuit 100.

As indicated above, the transmitted data comprises a plurality of groups of mark pulses separated by space pulses which are applied to the inputs of the mark pulse amplifier 103 and the space pulse amplifier 104. The first group of mark pulses is applied by the amplifier 103 to the common output conductor 115 to operate the first of the plurality of electronic data registers to store the value of this first digit. The input to the first electronic data register is provided with an enabling bias by a first tube 260 in the steering circuit 102, which is primed into a conductive condition by the application of a B+ potential to a conductor 261 by the readout control circuit 101 incident to the cycle of resetting operation described above. Rendering the tube 260 conductive provides a potential drop across a cathode resistor 262 which is coupled both to the control electrode of a next tube 270 in the counting chain forming the steering circuit 102 and to a terminal 263 which is connected to the control electrode of the drive tube in the first electronic data register.

The steering circuit 102, which is shown and described in detail in the above-identified copending Clement et al. application, in response to the transmission of the first space pulse to the amplifier 104, renders the first electronic data register ineffective and renders a second electronic data register, the input of which is connected in common to the mark pulse conductor 115, effective to receive the next group of mark pulses transmitted from the seized trunk recorder 92. A detailed description of this operation of the steering circuit 102 is set forth in the above-identified copending Clement et al. application, but, in general, the application of this first space pulse to the conductor 116 provides a pulse which is coupled through a plurality of input condensers, similar to a condenser 271, to the control electrodes of all of the tubes in the steering circuit 102, only a few of which are illustrated in the drawing. This pulse is effective to fire the tube 270 inasmuch as a positive bias is provided for this control electrode from the cathode resistor 262 of the preceding tube 260 in the chain forming the steering circuit 102. For a similar reason, none of the remaining tubes in the steering circuit 102 are fired at this time.

Firing the tube 270 produces an increased current drain through a common anode resistor 264 so that the anode potential supplied to the tubes in the steering circuit 102 is reduced. The cathode potential of the fired tube 260, due to the drop across the cathode resistor 262, is high enough so that when the anode potential is reduced by firing the tube 270, conduction in the tube 260 can no longer be sustained and, accordingly, this tube is extinguished to remove the positive potential from the terminal 263 and thereby render the first data register ineffective to receive additional mark pulses. Further, the firing of the tube 270 provides a positive potential across a cathode resistor 272 which is supplied to a terminal 273 and to the control electrode of a subsequent tube in the steering circuit 102. The application of the positive potential to the terminal 273 renders the input to another one of the electronic data registers effective to receive the next group of mark pulses supplied to the amplifier 103, and the application of the enabling potential to the next tube (not shown) in the steering circuit renders this tube responsive to the next pulse supplied to the space pulse conductor 116 by the amplifier 104.

As described in the above-identified applications, this operation of the steering circuit 102 continues under the control of the transmitted space pulses to render different electronic storage devices effective to receive the series of groups of mark pulses. When a selected space pulse, such as the fourth space pulse, is received by the steering circuit 102, indicating that a dialed party digit and the three called office code digits have been transmitted to the data storing registers, a tube 230 in the steering circuit 102 is rendered conductive, as described above, to apply a positive signal over a conductor 231 to the control electrode of the interpreter start tube 107. The tube 107 is now rendered conductive to complete an operating circuit for an interpreter start relay 130 extending from ground through the tube 107 and the contacts 175.

The operation of the interpreter start relay 130 closes a pair of contacts 131 and opens a pair of contacts 132. The closure of the contacts 131 applies ground to a conductor 232 extending to an office code interpreter circuit to initiate the translation of the stored called office code digits into data relating to the alphabetical and numerical characters designating the called office and into a portion of a rate structure used by a charge computer in establishing the charge to be assessed for the toll call. The opening of the contacts 132 interrupts a point in one operating circuit for the alarm relay 180, thereby to indicate that the interpreter start relay 130 has been operated.

The readout amplifier circuit 100 further includes means responsive to the storage of a predetermined amount of information for indicating that a recording operation is to be initiated upon the completion of the storage of the items of information pertaining to the toll call being transmitted by the trunk recorder 92, as distinguished from a resetting operation for incomplete calls for which insufficient information is stored in the registers. As set forth in the above-identified copending applications, date and time information is recorded in conjunction with a call following the receipt of answering supervisory signals indicating the completion of the call, and, accordingly, a space pulse associated with date or time data fires a tube 235 in the steering circuit 102 to provide a positive signal over a conductor 236 to the control electrode of a complete call tube 108 to fire this tube. Rendering the tube 108 conductive completes an obvious operating circuit, including the contacts 176, for a call complete relay 140.

The operation of the relay 140 closes a plurality of contacts 141 and 143 and opens a plurality of contacts 142 and 144. The opening of the contacts 144 interrupts a point in another operating circuit for the alarm relay 180 to indicate the satisfactory operation of the relay 140. The opening of the contacts 142 interrupts a point in an open circuit for applying ground to the conductor 223 to prevent the operation of the reset relay in the circuit 101 at the end of the storage of the data being transmitted since the stored data pertains to a complete call and is to be recorded. The closure of the contacts 143 prepares a circuit extending to the open contacts 195 for applying ground to a conductor 237 to operate a readout prepare-to-read relay in the readout control circuit which causes the stored data in the registers to be recorded.

In accordance with a feature of the present invention, the complete call relay 140 checks the proper operation of the interpreter start tube 107 and the interpreter start relay 130 since the complete call relay 140 will not be operated until after the interpreter start relay 130 should have been operated. More specifically, if the relay 130 has been operated to open the contacts 132 when the relay 140 operates, the closure of the contacts 141 performs no useful function. However, if the relay 130 has failed to operate for any reason, the contacts 132 remain closed when the relay 140 operates, and the closure of the contacts 141 completes an operating circuit for the alarm relay 180 extending through the closed contacts 173.

The operation of the alarm relay 180 closes a plurality of contacts 181 and 182. The closure of the contacts 182 completes a holding circuit for the relay 180 extending to ground at a pair of normally closed contacts 241 on a manually actuated alarm release key 242. The closure of the contacts 181 completes an energizing circuit for an alarm lamp 238 which is connected to a common supervisory circuit. The illumination of the lamp 238 indicates the existence of an alarm condition in the circuit 100 which remains until the key 242 is manually operated, but the operation of the relay 180 does not arrest further operation of the circuit 100.

In order to check on the proper operation of the call complete relay 140, there is provided a check call complete tube 109 and an associated check call complete relay 150. When, for example, a space pulse subsequent to the one used to fire the tube 235 is supplied to the conductor 116, a tube 245 is rendered conductive to apply a positive signal over a conductor 246 to the control electrode of the check tube 109 to fire this tube. Rendering the tube 109 conductive completes an obvious operating circuit for the relay 150 extending through the closed contacts 177.

The operation of the relay 150 opens the contacts 151 and closes a plurality of contacts 152 and 153. These contact operations perform no useful function if the relay

140 has previously been operated, as described above. However, if the relay 140 has failed to operate for one reason or another, the operation of the relay 150 performs the functions normally performed by the relay 140 and also establishes an alarm condition. Thus, assuming that the relay 140 is released, the opening of the contacts 151 interrupts the circuit for applying ground to the conductor 223 at an additional point to indicate that the data in this register is not to be cleared without recording. The closure of the contacts 152 prepares a circuit including the contacts 142 for applying ground to the conductor 237 to cause the data stored in the register to be recorded at the end of the storage of the call data.

To provide an alarm indicating that the relay 140 has not operated, the closure of the contacts 153 extends ground through the closed contacts 144 to the operating winding of the alarm relay 180 so that the alarm relay 180 operates. As described above, the operation of the alarm relay 180 closes the contacts 182 to complete a holding circuit for the relay 180 and closes the contacts 181 to apply ground to the alarm lamp 238.

After the mark and space pulses representing all the items of information pertaining to a single toll call have been transmitted from the trunk recorder 92 and stored in the electronic data registers, a COE signal comprising simultaneous mark and space pulses is transmitted to the recording facilities to indicate the end of the transmission of the data pertaining to the call. This signal operates the circuit 100 to initiate either a recording of the data pertaining to a complete call by the recorder 94 or a resetting operation if the stored data pertains to an incomplete call. The mark and space pulses of the COE signal are coupled through the condensers **103*a* and 104*a* to the control electrodes of the COE tube 105 to fire this tube. Firing the tube 105 operates the COE relay 190 to open the contacts 191 and 194 and to close the contacts 192, 193 and 195. The opening of the contacts 194 interrupts a point in the energizing circuit for the alarm lamp 220, and the closure of the contacts 193 applies ground to the conductor 222 to hold the release circuit in the circuit 101, conditioned during the interval that the relay 190 is operated. The closure of the contacts 192** performs no useful function at this time.

The opening of the contacts 191 interrupts a point in the circuit for providing ground to the clutch conductor 207 to arrest both movement of the magnetic tape in the seized trunk recorder 92 and the attendant transmission of items of information to the data storage registers. The closure of the contacts 195 completes one of the above-described circuits for applying ground to the conductor 237 to initiate the recording of the data stored in the registers.

In accordance with another feature of the present invention, a COE check tube 106 and a COE check relay 160 are provided in the circuit 100 to insure that the more important functions normally performed by the COE relay 190 are performed in response to the transmission of the COE signal. The space pulse forming a part of the COE signal is also applied to the steering chain 102 over the conductor 116 to fire a tube 250 therein. Firing the tube 250 supplies a positive signal over a conductor 251 to the control electrode of the COE check tube 106 to fire this tube.

Firing the tube 106 provides a ground path through the contacts 174 for operating the COE check relay 160 to open a pair of contacts 161 and to close a pair of contacts 162. The operation of the relay 160 performs no useful function if the relay 190 has been operated. However, if the relay 190 fails to operate for one reason or another the opening of the contacts 161 removes ground from the clutch conductor 207 to prevent further transmission of data from the trunk recorder 92. The closure of the contacts 162 supplies ground through the closed contacts 194 to illuminate the alarm lamp 220, the other terminal of which is connected to grounded battery in a common supervisory circuit. The alarm 220 indicates that COE tube 105 failed to fire and that the COE check tube 106 has operated to stop the magnetic tape in the seized trunk recorder 92. It will be appreciated that the COE check relay 160 does not perform the same functions as the COE relay 195 but merely arrests movement of the magnetic tape in the trunk recorder 92 and actuates an alarm without initiating a recording or resetting operation. The stored data can be recorded by manually operating the key 242 to close a pair of contacts 240. The closure of the contacts 240 operates the relay 190 to actuate the contacts controlled thereby, as described above. The opening of the contacts 194 removes the energization of the lamp 220 to remove the alarm indication.

The application of ground to the conductor 237 by operation of the relay 190, either manually or under the control of the COE tube 105, initiates operation of a printing control or readout relay chain, as described in detail in the above-identified copending applications, during which the stored data is recorded by the recorder 94. When the last item has been recorded, the reset relay in the circuit 101 is operated to reset the data registers and to apply ground to the conductor 206 to operate the amplifier reset relay 170. The operation of the relay 170 opens the contacts 171–177. The opening of the contacts 171 interrupts an additional point in the circuit providing a ground to the clutch conductor 207, and the opening of the contacts 173 interrupts the operating circuit for the alarm relay 180, but this relay remains operated until the key 242 is actuated to open the contacts 241. The opening of the contacts 174, 175, 176 and 177 opens the plate circuits of the tubes 106, 107, 108 and 109, respectively, to extinguish these tubes, and, accordingly, to release the COE check relay 160, the interpreter start relay 130, the complete call relay 140, and the check complete call relay 150, respectively.

The opening of the contacts 172 interrupts the operating circuit for the COE relay 190 so that this relay releases to open the contacts 192, 193 and 195 and to close the contacts 191 and 194. The closure of the contacts 191 prepares a path for applying ground to the clutch conductor 207, which path is open at the contacts 171. When the resetting operation is completed, the reset relay in the circuit 101 releases to remove ground from the conductor 206 to release the amplifier reset relay 170, thereby to restore the circuit 100 to a condition to control the transmission of the next data stored in the seized trunk recorder 92. The closure of the contacts 171, upon release of the relay 170, again applies ground to the clutch conductor 207 so that movement of the magnetic tape is initiated to cause the transmission of groups of mark pulses separated by space pulses representing the items of information pertaining to the second toll call stored in the seized trunk recorder 92.

This above-described operation is continued until all of the data stored in the seized trunk recorder 92 has been transmitted and this trunk recorder has been released. Incident to the release of the seized trunk recorder 92 and the seizing of an additional trunk recorder, the readout amplifier control circuit 100 operates as described above to check the adequacy of the mark and space pulse amplifying channels and to control the transmission of the magnetically stored items to the electronic data registers associated with the recorder 94. When the last trunk recorder has been played back, ground is removed from the conductor 200 by the circuit 101 to release the relay 110 and consequently the relay 120. The release of these two relays restores the circuit 100 to its normal condition.

Although the operation of the automatic telephone system of the present invention is described above in conjunction with particular means for selecting, storing, and recording data pertaining to toll calls, it should be understood that many other modifications and embodiments may be provided by those skilled in the art which will fall within the spirit and scope of the principles of the present invention.

What is claimed and desired to be secured by Letters Patent of the United States is:

1. For use in a data processing system including a register having intelligence data and control data stored therein which is transmitted to a recording device to control the production of records of the intelligence data, the combination of means for initiating the transmission of stored intelligence and control data, first control means operated by transmitted control data for arresting transmission of said intelligence data, and second control means responsive to a portion only of said transmitted control data for arresting transmission of said stored intelligence data.

2. The combination set forth in claim 1 including recorder start means and in which said first control means includes means controlled by said transmitted control data for operating said recorder start means.

3. The combination set forth in claim 1 in which alarm means are provided which are operated in response to operation of said second control means when said first control means fail to operate.

4. For use in an automatic toll ticketing system including a register for storing call data and control signals comprising concurrent signal bits which are transmitted to a recorder, the combination of means for initiating transmission of said call data and said control signals, first control means operated by the transmission of both of said concurrent signal bits for terminating transmission of said call data, and second control means operated by the transmission of only one of said concurrent signal bits for terminating transmission of said call data.

5. The combination set forth in claim 4 in which the first control means includes an electronic device having at least a pair of control electrodes and in which the electronic device is operated only by the simultaneous application of one of said concurrent signal bits to each of said control electrodes.

6. The combination set forth in claim 4 including recorder start means and in which the first control means includes means for operating said recorder start means.

7. For use in an automatic toll ticketing system including a register for storing call data and control signals which are transmitted to a recorder over a channel having electronic devices with filaments, the combination of a time delay device, means for energizing said filaments and said delay device, means operated by said delay device after a selected time interval to initiate transmission of stored call data and control signals, first control means operated by said control signals for stopping the transmission of said call data, and second control means operated by a portion of said control signal for stopping the transmission of call data.

8. For use in an automatic toll ticketing system including a trunk recorder having a sensible medium on which call data and control signals comprising concurrent signal bits are stored for transmission to a recorder over a channel having electronic devices with filaments, the combination of means for initiating movement of said sensible medium to transmit said stored call data and said stored control signals over said channel, means for energizing said filaments, a thermal time delay device energized concurrently with said filaments, means including said delay device for operating said movement initiating means, a first electronic device having at least a pair of control electrodes each adapted to receive one of said signal bits from said channel, first control means including said first electronic device and responsive to the simultaneous application of both of said signal bits to said control electrodes for arresting movement of said medium and for initiating operation of said recorder, a second electronic device including at least one control electrode adapted to receive one of said signal bits from said channel, and second control means including said second electronic device for arresting movement of said medium.

9. The combination set forth in claim 8 including alarm means, and means operated by the operation of said second control means when said first control means is not operated to actuate said alarm means.

References Cited in the file of this patent

UNITED STATES PATENTS

| | | |
|---|---|---|
| 2,073,701 | Lazzarini | Mar. 16, 1937 |
| 2,396,409 | Berzer | Mar. 12, 1946 |
| 2,447,533 | Retallack | Aug. 24, 1948 |
| 2,561,602 | Valentino et al. | July 24, 1951 |
| 2,594,495 | Detallack | Apr. 29, 1952 |
| 2,767,246 | Retallack | Oct. 16, 1956 |
| 2,794,070 | Ostline | Aug. 28, 1957 |
| 2,802,060 | Coco | Aug. 6, 1957 |
| 2,894,068 | Morris et al. | July 2, 1959 |